INVENTOR.
ALBERT P. STROM
BY
Willard R. Crout

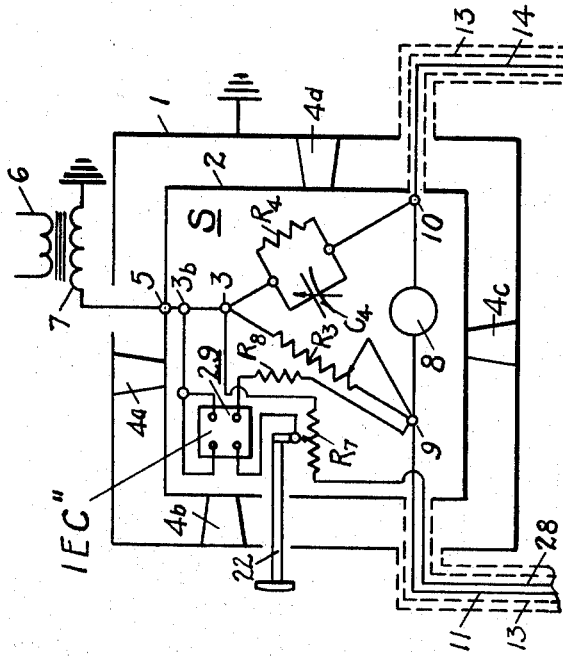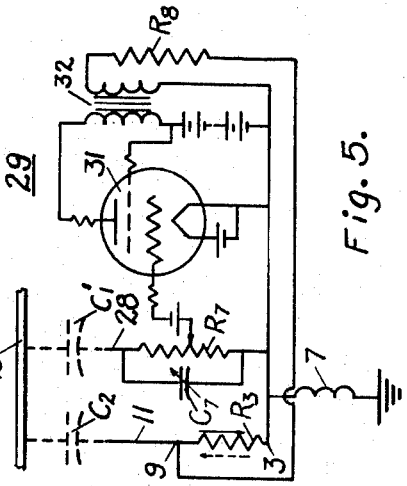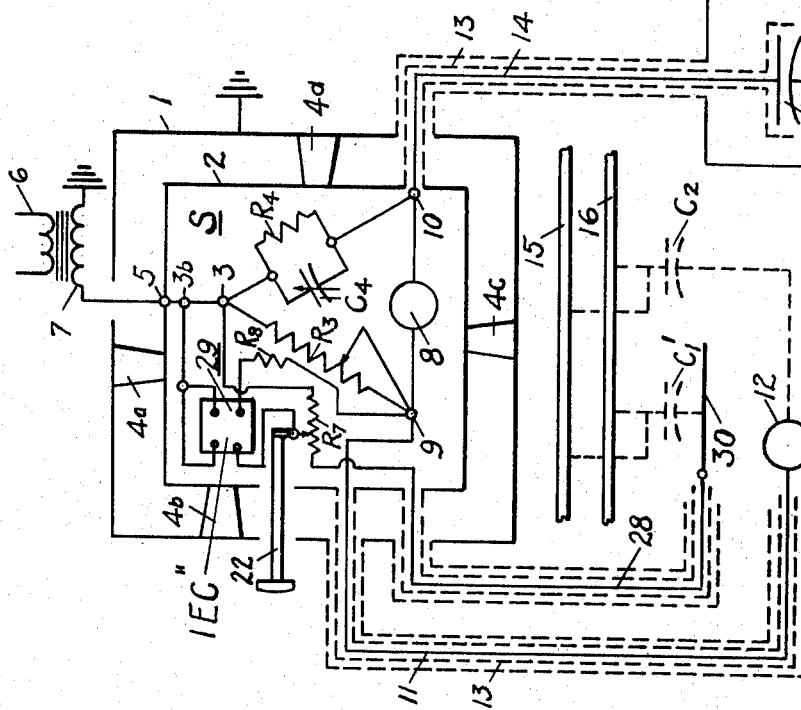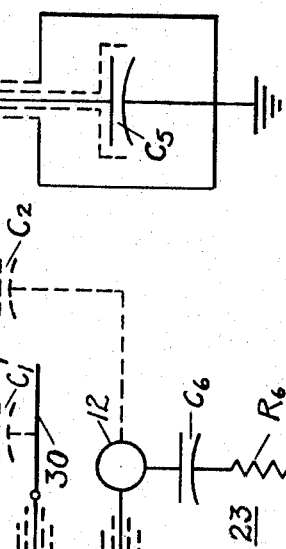
Fig. 4.
Fig. 5.
Fig. 3.
INVENTOR.
ALBERT P. STROM
BY Willard R. Crout INVENTOR.
ALBERT P. STROM
BY
Willard R. Crout

INVENTOR.
ALBERT P. STROM

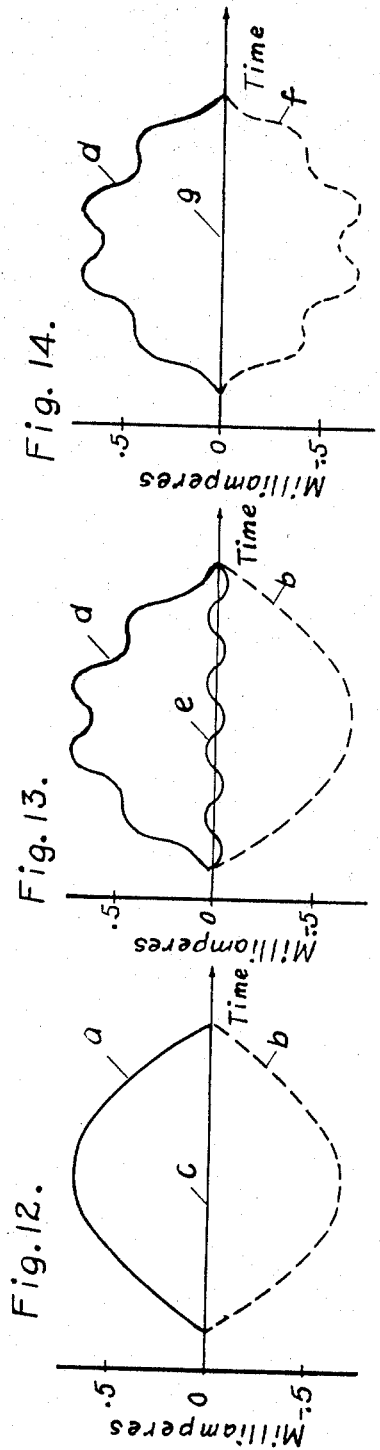
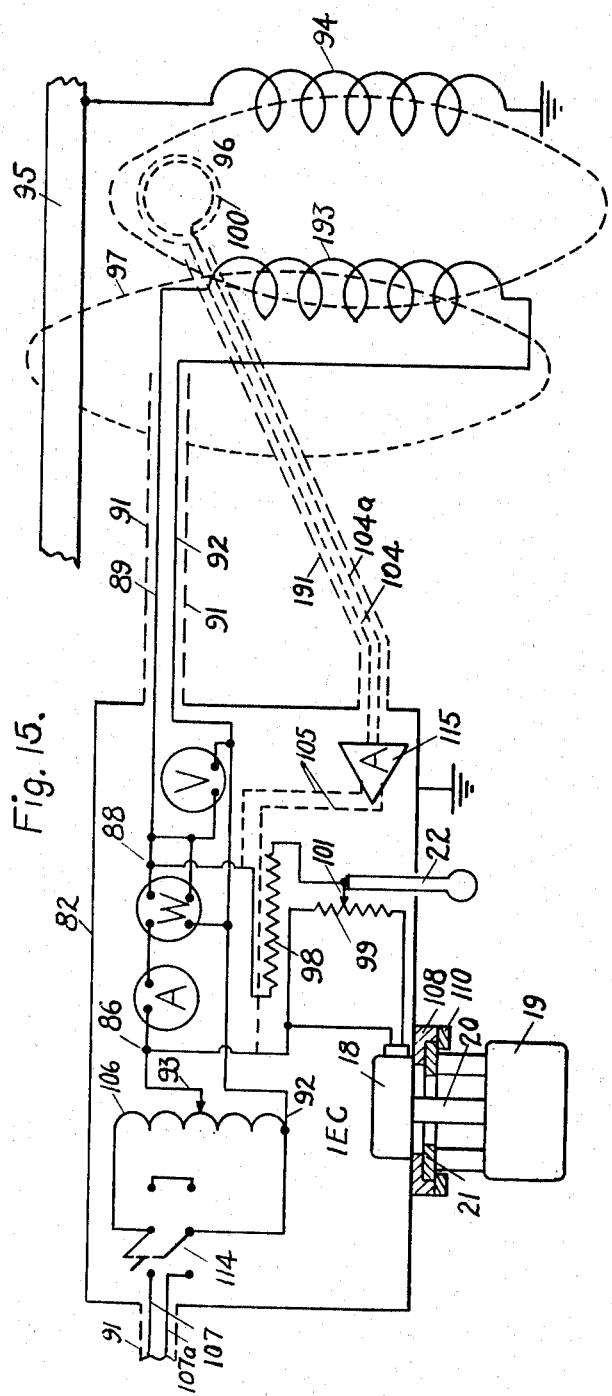

United States Patent Office 3,439,265
Patented Apr. 15, 1969

3,439,265
APPARATUS FOR SUPPRESSING INTERFERENCE CURRENTS IN A MEASURING CIRCUIT BY BYPASSING THE INTERFERENCE CURRENTS AROUND A BRANCH OF THE MEASURING CIRCUIT THROUGH THE SUPPRESSING MEANS
Albert P. Strom, 222 Castlegate Road, Forest Hills, Pa. 15221
Filed June 8, 1965, Ser. No. 462,345
Int. Cl. G01r 31/12
U.S. Cl. 324—54          6 Claims

ABSTRACT OF THE DISCLOSURE

An electrical measuring instrument for measuring various electrical values in an A.C. system with an interference suppressor device for bypassing the interfering current around a measuring branch of the metering circuit by means of a parallel high-impedance circuit which provides a voltage of the system frequency variable in magnitude and phase. The suppressor device thus causes a current to flow in the parallel high-impedance circuit equal in magnitude and in phase with the interfering current so that the spurious current is balanced out of the measuring circuit prior to energization of the electrical measuring instrument. In one arrangement an antenna located adjacent to the test specimen provides an input voltage to a linear amplifier in the interference suppressor to match the harmonics of the interfering system. Other arrangements use generators driven by synchronous motors variable in magnitude and phase.

---

This invention relates, generally, to electrical measuring instruments, and, more particularly, to improved structures and methods to suppress electrical interference on electrical measuring instruments due to adjacent energized alternating-current conductors.

A general object of the present invention is to provide improved means associated with electrical measuring instruments to effect suppression of electrical interference caused by the proximity of adjacent energized alternating-current high-voltage conductors.

Another object of the invention is to provide improved measuring instruments which are free of error due to electrical interference caused by adjacent alternating-current relatively high-voltage conductors.

Still a further object of the invention is to provide improved methods for effecting suppression of electrical interference on electrical measuring instruments due to the close proximity of adjacent energized alternating-current conductors.

When sensitive measuring instruments are used near energized alternating-current circuits, it is frequently found that there is considerable interference which causes the meter readings to be erratic. This interference is, in many cases, so serious that no reliable measurements can be made. This interference is generally due to a capacitance or magnetic pickup by the instrument, or the test sample, that is being measured. In general, capacitive interference is most likely to occur. A capacitance current may flow from energized lines or busses to the sample being measured, and thence flow to ground through some of the circuits in the measuring instrument. This spurious current, whether capacitive or inductive, produces an erroneous indication in the measuring instrument, even in some cases giving negative readings.

One of the instruments in which this occurs is the Schering bridge. Here, for example, when measuring the power factor and capacitance of a terminal bushing, a capacitance current may flow from an adjacent energized line to the high-voltage terminal of the terminal bushing under measurement, and thence to ground through a circuit in the bridge. The voltage of the overhead line, although it is operating at a synchronous frequency with the bridge power source, is at some unknown phase displacement, which further complicates the situation. One of the important applications of the present invention is to provide improved means associated with the usual Schering-bridge circuit to effect suppression of electrical interference in Schering-bridge measuring circuits. However, it is to be clearly understood that the present invention has wide application to other types of measuring instruments, and is not to be construed as confined, or limited only to Schering-bridge measuring circuits. Reference may be had to United States patent application filed June 14, 1962, Ser. No. 202,463, by James H. Frakes for the bridging-circuit diagrams and the theory regarding inverted Schering-bridge operation for testing insulation specimens.

As well known by those skilled in the art, it is desirable to periodically determine whether a terminal bushing is reliable or defective by measuring the energy loss through, and the charging current or capacitance of, the insulation when alternating voltage of known value is applied to the insulation in the field, i.e., the location where it is set up for use. The power factor is a good indication of the condition of insulation, inasmuch as the power factor of the insulation does not depend upon the size of the test specimen, but only upon its quality as insulation. There would be no energy loss whatsoever in a perfect insulator, and, as a consequence, a perfect insulator would have power factor. Thus, the power factor of the insulation is indicative of its electrical insulation qualities. The power factor will indicate the dielectric losses and show the general condition of the insulation. The capacitance measurement is valuable to show if a weakness exists in any layer of the terminal bushing.

Conditions which will lead to an increase in the energy loss through the terminal bushing, and hence an increase in the value of the power factor, will be the seepage of moisture through gaskets and joints into the terminal bushing to cause deterioration therein, slight leakage currents across dirty or contaminated surfaces interiorly and exteriorly of the bushing casing, voids in the condenser winding which may char over long periods of time, and leakage through the oil exteriorly of the terminal bushing. All these leakage currents are in parallel between the energized conductor stud passing through the terminal bushing and the grounded supporting flange. Thus, if the foregoing conditions are ignored, or not periodically checked, the breakdown resistance of the insulation may be lowered to such an extent that the terminal bushing may fail in service.

It is, accordingly, a further object of the present invention to provide improved Schering-bridge measuring devices, which will render accurate and reliable readings despite the close location of energized high-voltage alternating-current conductors.

In accordance with one particular aspect of the instant invention, and as pertaining to Schering-bridge application, the method of my invention contemplates the injection into the metering circuit, in which the interference current flows, of a voltage which is equal in amplitude and opposite in phase to the voltage drop in the circuit due to the interference current flowing in the circuit. The interference current flows in the bridge circuit resistance, which is connected directly to the terminal bushing under measurement. This resistance is, for example, generally in the order of 300 ohms. The interference current through it is, however, only in the order of 50 microamperes, so that the interference voltage is only about 15 millivolts. Such a voltage can be injected into the 300 ohm circuit by sending a current of 15 milliamperes through a 1 ohm resistor which is connected in series therewith, and forms a part of the 300 ohm circuit. This current must, of course, be variable both in phase and amplitude, so that a voltage can be set up in the 1 ohm resistor which will exactly suppress the interference voltage.

In accordance with one embodiment of my invention, the voltage for producing the suppressing current is supplied by a miniature permanent magnet, sine wave generator, driven by a synchronous motor. The synchronous motor may be mounted on the outside of the Schering-bridge case at ground potential, and the generator is preferably mounted in the inner instrument box, which is insulated from ground. The generator is connected to the motor by means of an insulating shaft, and the motor is mounted so that it can be rotated 360 electrical degrees, thus permitting shifting of the injected voltage phase through a full cycle. The generator may supply current to a resistor of about 1 or 2 ohms, which is connected in series with the bridge circuit resistance. Current through this resistance may be regulated by means of a potentiometer and series resistor in the generator circuit. The interference may be balanced out before application of test voltage on the bridge by bringing the deflection on the null amplifier meter to zero with the adjustment of phase and magnitude of the suppressor output.

As pointed out above, the attempt is made in my invention to suppress the interference by introducing a sine wave voltage into those elements of the instrument in which interference current flows, exactly equal in magnitude and opposite in phase to the voltage produced by the interference current. In an impedance element of a meter across which the voltage due to the instrument current is to be measured, the effect of interference-current voltage is thus neutralized, and the voltage due to the instrument current only, is measured. This method can readily be used wherever the measured quantity is a voltage across an element in the meter, as it is, for example, in a Schering bridge.

In accordance with another aspect of the instant invention, and as pertaining either to the Schering-bridge application, or to current or power measuring instruments, the method of my invention contemplates the by-passing of the interference current around the metering element in which it would normally flow. To by-pass the interference current from the measuring element or meters, a current exactly equal and opposite in phase to the interference current is injected into the measuring circuit from a parallel circuit. The interference current is thereby forced to flow through the parallel circuit, and no longer exists in the measuring elements or meters.

As already described for the voltage interference suppressor, the source of current may be a small sine wave generator driven by a synchronous motor, with provision for varying the phase and magnitude of the current injected into the measuring circuit. The impedance of the parallel circuit should in this case be in the order of 100 times that of the metering circuit, so that its shunting effect on the measuring current is negligible. For example, if the metering element has a resistance of 300 ohms, a minimum parallel circuit resistance of about 30,000 ohms might be used. If the interference current is 50 microamperes, the voltage on the parallel circuit must be $50 \times 30,000 \times 10^{-6} = 1.5$ volts to supply the interference suppressing current. The interference will have been eliminated, and the error due to the parallel circuit will be less than 1%, and can be still further reduced if a higher parallel resistance is used.

These systems work very well where the interference is almost a pure sine wave with small harmonic content, since the suppressor wave is sinusoidal. However, it has been found that in some cases the interference currents in the instrument, induced from the nearby transmission lines, contain an appreciable amount of harmonics. These harmonics cannot be neutralized by a sinusoidal suppressor wave. It is, accordingly, a further object of my invention to disclose a suppressor system that can neutralize interference currents containing harmonics, as well as the fundamental frequency.

According to a further embodiment of my invention, therefore, a suppressor voltage exactly equal and opposite to that produced in the measuring circuit by the interference current is introduced into the measuring circuit, but in this case the suppression waveform is picked up on the input of a linear amplifier from a part of the interference itself. The output will thus produce a wave which, within the limits of linearity of the amplifier, is exactly the same as the interference current. As a result, this wave will then suppress the interference regardless of what harmonic content the interference current may have. The interference may be balanced out before application of test voltage on the bridge by bringing the deflection on the null amplifier meter to zero with the adjustment of phase and magnitude of the suppressor output. Such an arrangement has the most important advantage in that should the interference change while the test is being made, the input to the amplifier also changes so as to automatically correct for the change in interference.

Still a further outstanding advantage of such an arrangement is that, in general, the output of such an amplifier is almost exactly 180 degrees out of phase with the amplifier input. This is exactly the phase required for suppressing the interference, and hence any phase adjustment would be small and could be provided by a simple R-C input circuit. The magnitude of suppressor current or voltage can then be adjusted by a volume control in the amplifier input and a resistor ($R_2$) in the amplifier output.

The interference currents in instruments used to measure the quality of insulation are generally capacitive currents from high-voltage lines adjacent to the measuring instruments. Inductively-induced interference in this case is usually negligible, due to the high impedance of the insulation. However, in the measurement of relatively low impedances, such as inductive reactors, adjacent to busses carrying high current, or adjacent current-carrying coils, inductively induced interference currents are produced in the measuring circuit. In this case, since the adjacent conductors are at relatively low voltages, and the measuring currents are large, the capacitive interference currents are usually negligible. These inductively-induced interference currents can be suppressed, just as for the capacitively-induced currents, by providing a parallel circuit to by-pass them around the metering elements.

Further objects and advantages will readily become apparent upon reading the following specification, taken in conjunction with the accompanying drawings, in which:

FIG. 3 illustrates another modification of the interference suppressor as applied to a Schering bridge;

FIG. 4 illustrates a slight variation of the suppressor arrangement of FIG. 3, except that the cable leads are combined into a single cable;

Figure 6:
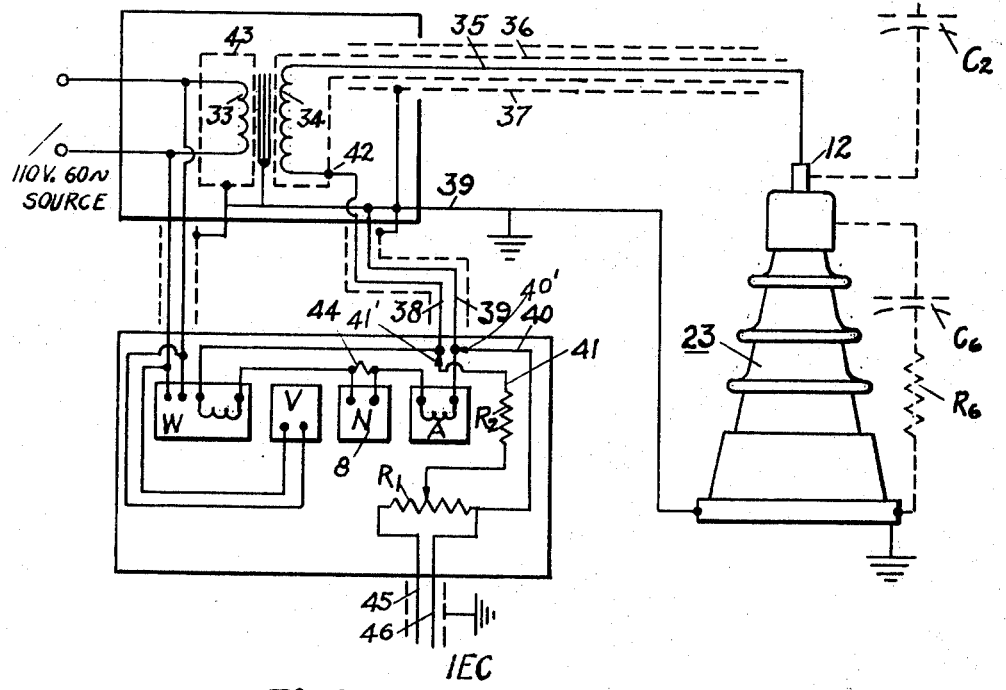
Figure 7:
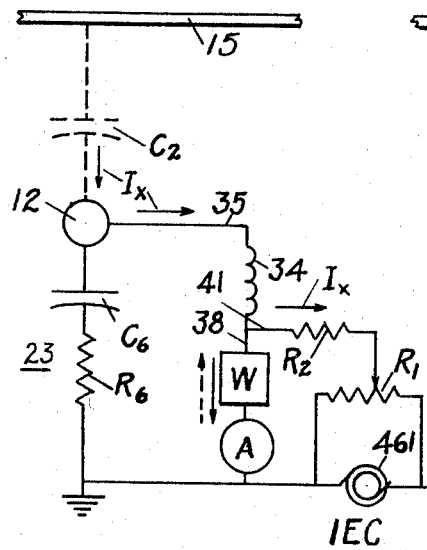
Figure 8:
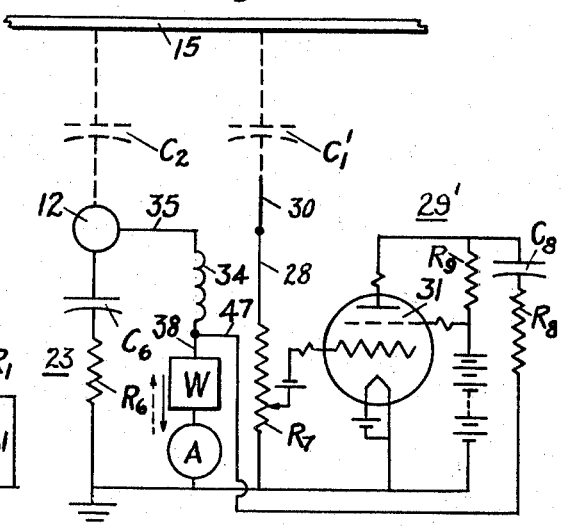
Figures 9, 10:
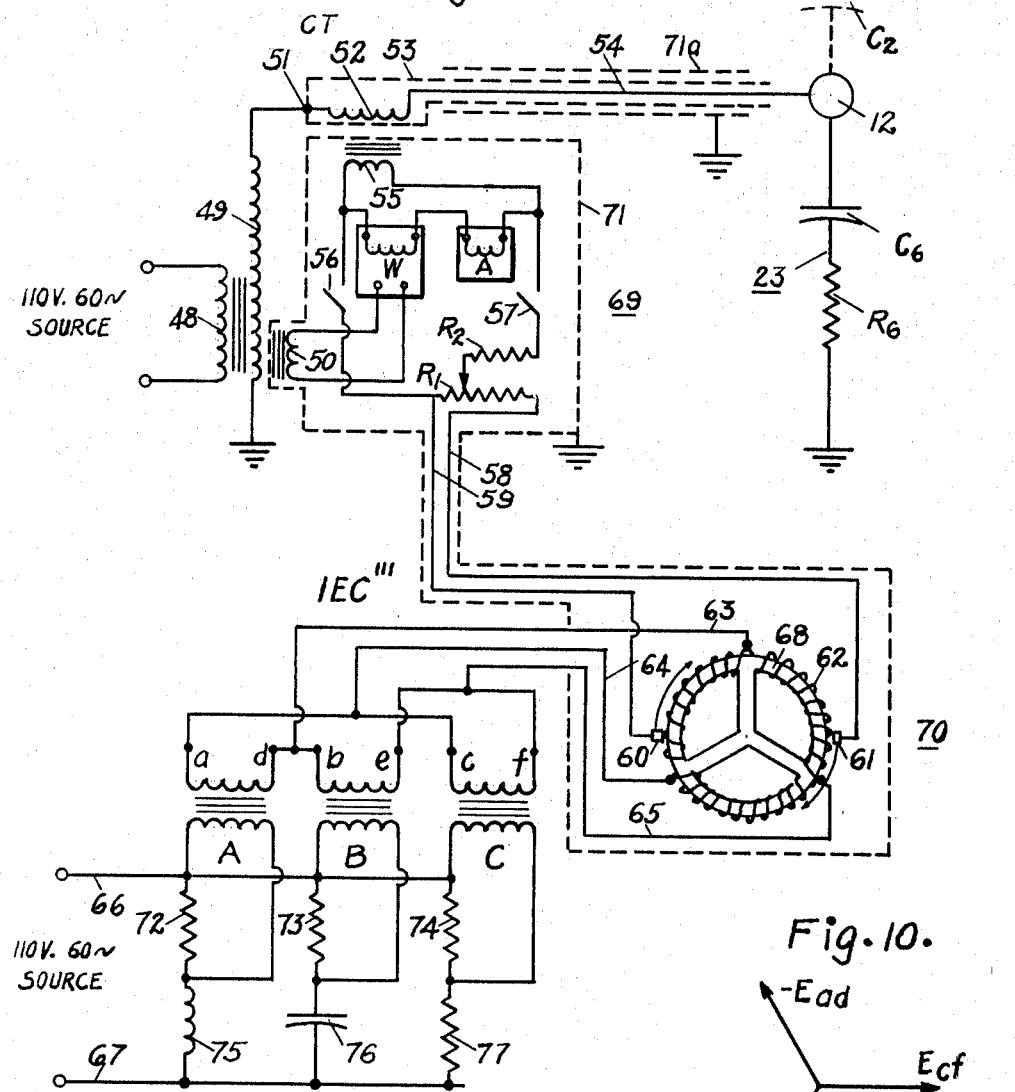
Figure 11:
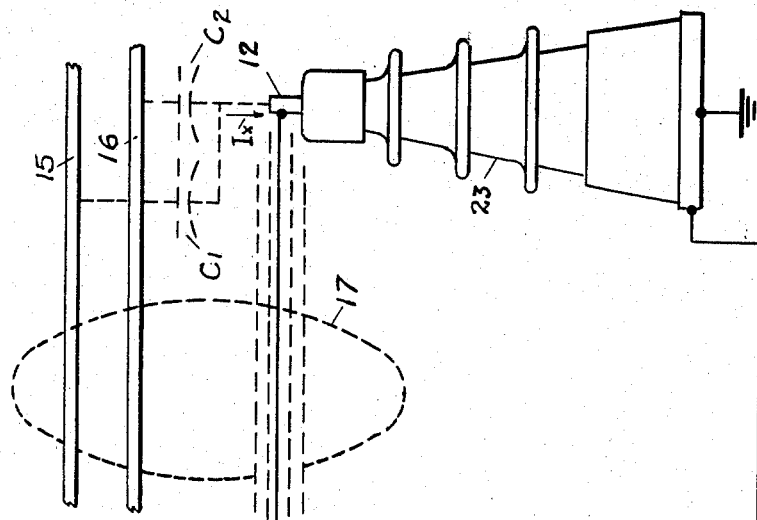
Figure 11:
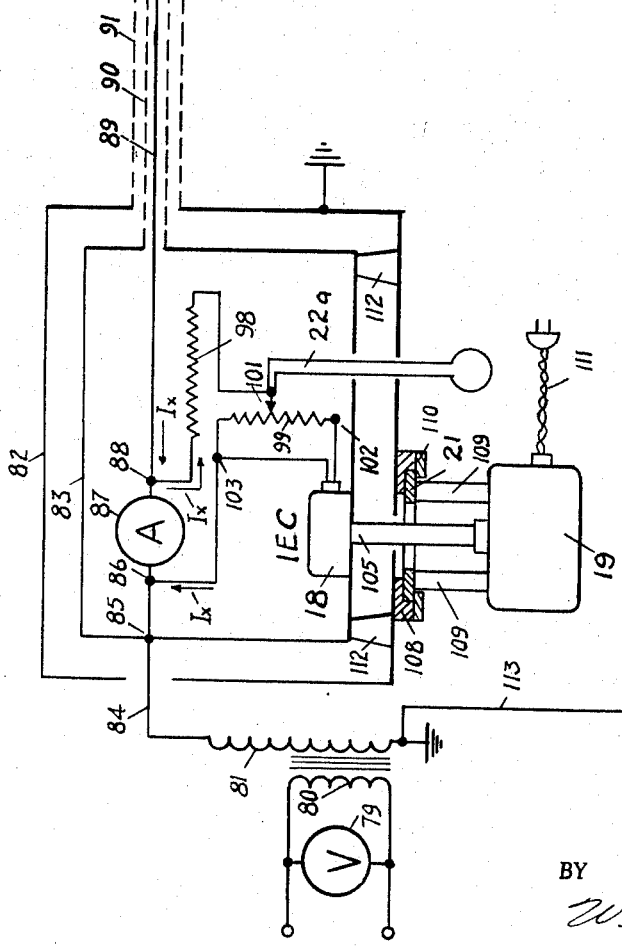

FIG. 5 diagrammatically illustrates in detail one form of amplifier which may be used in the embodiments of FIGS. 3 and 4;

FIG. 6 diagrammatically illustrates an interference suppressor used with an ammeter-wattmeter type of instrument;

FIG. 7 illustrates schematically the operation of the interference suppressor of FIG. 6;

FIG. 8 diagrammatically illustrates a linear amplifier to supply the interference suppressing voltage as used with an ammeter-wattmeter type of measuring instrument;

FIG. 9 schematically illustrates the application of a static-type of voltage supply for the interference suppressor, again the suppressor being used on an ammeter-wattmeter type of measuring instrument;

FIG. 10 is a diagrammatic view illustrating the phase relations of the coils in FIG. 9;

FIG. 11 diagrammatically illustrates the interference suppressor of my invention in a simple measuring circuit in which a sensitive ammeter is used to measure the capacitive impedance of a high-voltage bushing;

FIGS. 12–14 graphically illustrate the various wave forms of interference voltage and the proper wave forms of suppressor voltage which must be used for correction; and FIG. 15 illustrates diagrammatically an application of my improved interference suppressor in measurements on relatively low impedances where interference currents are induced mainly by magnetic induction.

Figure 1:
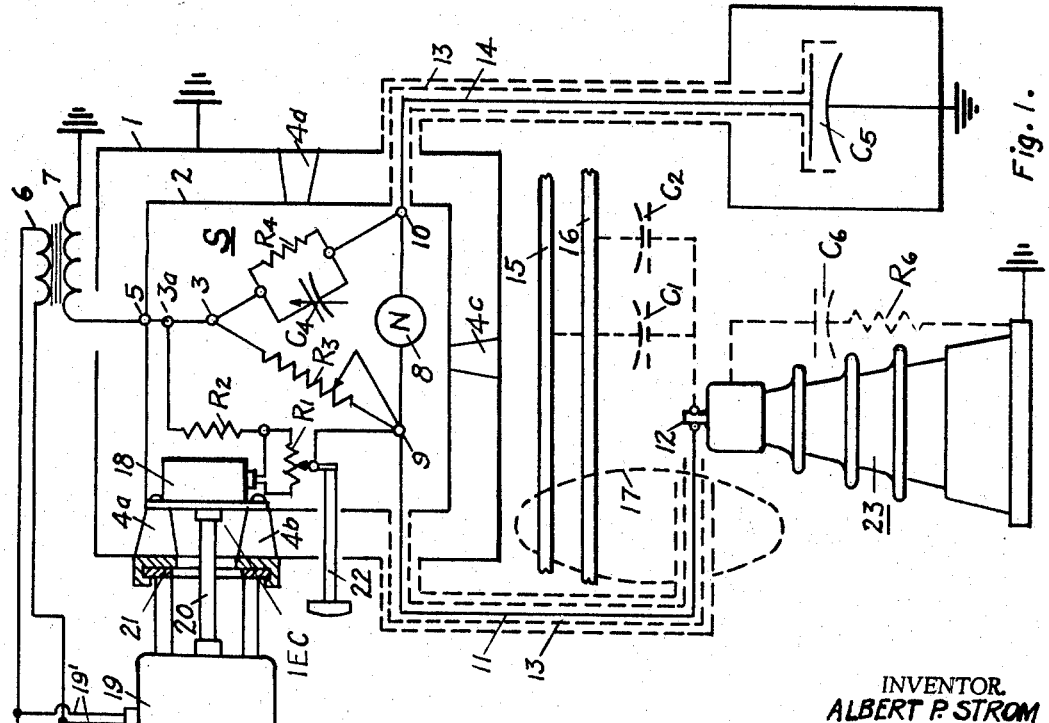
FIG. 1 is a diagrammatic view illustrating the application of the principles of the present invention by providing an interference suppressor in a Schering-bridge circuit used in measuring the capacitance and power factor of a conventional-type terminal bushing.

Referring to the drawings, and more particularly to FIG. 1 thereof, the reference numeral 1 indicates the outer grounded metallic shielding casing containing the Schering-bridge assembly S. Reference numeral 2 designates the inner shielding casing, which is insulated from the outer shielding box and is supported by a plurality of insulating post insulators 4a, 4b, 4c and 4d. The Schering-bridge elements within shielding casing 2 comprise resistance arm $R_3$, resistance and parallel capacitance arms $R_4$, $C_4$, and a high-impedance null indicator 8. Alternating-current power is supplied to the Schering-bridge S from a transformer T, in which the reference numeral 6 indicates the low-voltage winding normally connected to any 110 volt alternating-current source. The reference numeral 7 designates the high-voltage winding, which is electrically connected to the inner shielding casing 2, as at 5, and thence to the Schering-bridge elements at point 3. The high-voltage winding 7 may impress a voltage of the order of 10 kv. upon the junction point 3, for example.

When the Schering bridge S is operated without the interference suppressor of my invention, the potentiometer $R_1$ and resistance $R_2$ are absent. The shielded cable lead 11 is connected directly to the end of resistance $R_3$, as at point 9, and at its other end to terminal 12 of the specimen 23 under test. Surrounding cable 11 is a high-voltage shield 13, which is essentially at the same potential as the cable conductor 11, since it is connected to shielding casing 2. The cable 11 is also connected to shielding casing 2 through resistance $R_3$, as at point 5, and since the normal voltage drop in $R_3$ is a small fraction of 1 volt, shield 13 and cable conductor 11 are essentially at the same potential. Hence, no appreciable capacitance current flows from cable conductor 11 to shield 13; and all of the current in resistance arm $R_3$ enters the test specimen 23 at point 12, and flows to ground through it. The equivalent impedance of specimen 23 is indicated by capacitance $C_6$ and resistance $R_6$.

Another similarly-shielded cable 14 is connected to the bridge circuit S at point 10. Cable 14 connects at its other end to a standard capacitor $C_5$. Since cable 14 is shielded, all the current that enters at point 10 flows through the standard capacitor $C_5$ to ground. The Schering bridge S is balanced by adjusting $R_3$ and $C_4$ until no current flows through the null meter 8. The dial settings of $R_3$ and $C_4$ then indicate, respectively, the capacitance and power factor of the test specimen 23.

However, if the specimen 23 under test is located adjacent to energized lines, indicated by reference numerals 15 and 16, which could be in the order of 100 kv. or higher above ground potential, a capacitance current will flow through the equivalent capacitance $C_1$ and $C_2$ from these lines 15, 16 to the terminal 12 of the test specimen 23. From this point there is a relatively low resistance path to ground through cable 11, resistance $R_3$ and high-voltage coil 7. This current through $R_3$ constitutes an interference with the normal Schering-bridge operation, and causes the Schering bridge S to read incorrectly.

There may also be some voltage induced by magnetic coupling if high-voltage line conductors 15, 16 are carrying a current. This is indicated by the closed magnetic loop 17. As a result of the foregoing interference, which may be considerable, balance of the bridge S may be rendered impossible of attainment, and bridge operation seriously impaired.

In accordance with the principles of my invention, this interference may be eliminated by using an interference-eliminating circuit IEC indicated by potentiometer $R_1$, resistance $R_2$, and a 60 cycle voltage source 18. Voltage source 18 supplies a voltage on potentiometer $R_1$, the movable point of which is connected to point 9. The other end of the potentiometer $R_1$ is connected to a suitable resistance $R_2$ (which should be large as compared to $R_3$), and thence to the other end of $R_3$ at point 3a. The voltage source in this case consists of a small permanent magnet generator 18 driven by a synchronous motor 19 having input leads 19', through an insulating shaft 20. The motor 19 is mounted on a rotatable plate 21, and can be rotated about its axis by 360 electrical degrees.

Typical synchronous motors have stationary armature windings and rotating poles. The word "synchronous" implies that the poles move 360 electrical degrees during each cycle of the AC voltage. Thus a 2-pole synchronous motor revolves one revolution per cycle, or exactly 3,600 r.p.m. on a 60 cycle system.

Since the motor must generate a counter-voltage approximately equal and opposite to the system voltage, at every instant, the poles must be at a position relative to its stator windings where maximum voltage is generated when line voltage is maximum. Hence the motor poles are opposite a particular position on the stator at maximum system voltage.

Assume that the motor stator is mounted so that it can be rotated about its axis, and that the rotor turns in a clockwise direction. Now if the stator is rotated 30 degrees clockwise, the poles will be 30 degrees clockwise of their former position when maximum counter-voltage is generated. This also will be the instant of maximum system voltage.

Assume now that an A.C. generator is directly connected to the synchronous motor shaft. The generator poles are on the rotor, and its armature is stationary. When the motor stator is now rotated 30 degrees clockwise, the generator poles as well as the motor poles will be advanced 30 degrees of their former position at the instant that maximum system voltage occurs. But the generator armature has remained stationary. Hence if it was originally generating maximum voltage simultaneously with the maximum of the system voltage, its poles will now be 30 degrees beyond the point on its armature where maximum voltage is generated. The generator voltage has thus been advanced in phase by 30 degrees in respect to system voltage. Thus, it is clear that if the motor stator can be rotated 360 electrical degrees, any desired phase of the generator voltage relative to the system voltage can thereby be obtained.

If the synchronous motor is supplied from the same system as the one producing the interference, it is clear from the foregoing that the output from generator 18 can be adjusted to any phase with respect to the interference by rotation of the motor 19. The voltage magnitude can be regulated to any value by adjusting potentiometer $R_1$ by means of an insulating control rod 22. A voltage drop can thus be produced across the terminals of $R_3$ which is just equal and opposite to the voltage drop in resistance arm $R_3$ due to the interference current. When this is done, the interference current actually by-passes $R_3$ and flows through $R_1$ and $R_2$. This condition is readily determined by observing null meter 8.

Before energizing the Schering bridge S with high-voltage transformer coil 7, the null meter 8 will deflect whenever interference current flows through resistance arm $R_3$. Therefore, when the phase and magnitude of voltage on the interference suppressor circuit IEC has been adjusted so that there is no deflection in null meter 8, there is no interference current in resistance arm $R_3$.

When the bridge S is now energized, only the current that passes through the test specimen 23 will flow through resistance arm $R_3$, and hence the effect of the interference has been eliminated.

I have obtained good results in the interference-suppressor arrangement IEC of FIG. 1 by using a 1/100 HP, 3,600 r.p.m. capacitor-type synchronous motor manufactured by the Eastern Air Devices, Inc. of Brooklyn, N.Y. Also, I employed a Doremeyer-type sine wave generator, Navy type CDQ 21768, 60 cycle, 3,600 r.p.m., manufactured by the A. F. Doremeyer Mfg. Co. of Chicago, Ill. With the foregoing equipment utilized in the suppressor circuit IEC, excellent results were achieved.

Figure 2:
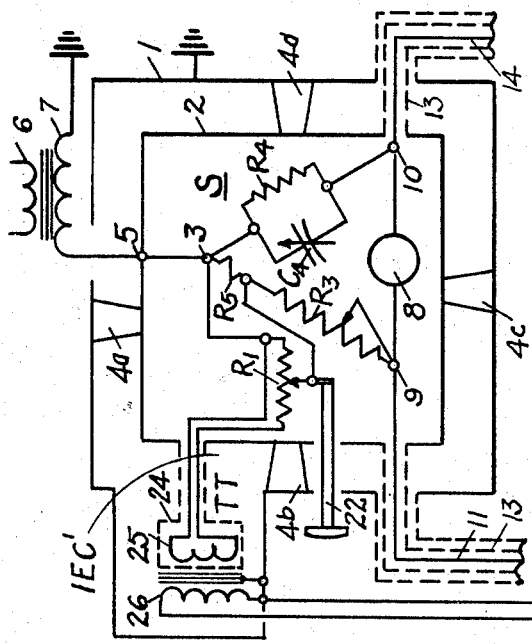
FIG. 2 shows another form of the interference suppressor in a Schering-bridge application similar to that of FIG. 1, the terminal-bushing connection and the cable connection to the standard condenser being broken away.
Figure 2:
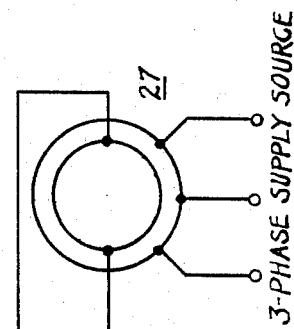

FIG. 2 illustrates another embodiment of my invention wherein the Schering bridge S in this figure and its operation is exactly the same as for FIG. 1, previously explained; and hence only the bridge elements and the suppressor circuit IEC' are shown in this figure. As in FIG. 1, the interference suppressing voltage is impressed across potentiometer $R_1$. The source of this voltage could be a generator and synchronous motor as shown in FIG. 1. However, in FIG. 2 the voltage source is a transformer TT in which the primary coil 26 is supplied from the stationary coils of a locked-rotor three-phase induction motor, generally indicated by the reference numeral 27. The phase of this input can now be changed through 360 electrical degrees by changing the position of the locked rotor. The secondary coil 25, which needs to develop an alternating-current potential difference of only a few volts, is insulated and is shielded by shield casing 24, which is at the potential of shielding casing 2.

The output from potentiometer $R_1$ is now fed into a resistance $R_5$ of low ohmic value (in the order of 1 ohm). Resistance $R_5$ is connected between resistance $R_3$ and terminal 3 of the bridge S. Resistance $R_5$ should preferably be less than 1% of resistance $R_3$ and hence negligible as compared to resistance $R_3$.

The voltage drop on resistance $R_5$ can now be made equal and opposite to that produced in resistance $R_3$ by the interference current. As before, the point where the interference effect is neutralized can be determined by bringing the null meter 8 to zero before applying test voltage to the bridge S. Since the voltage drop in $R_3$, due to the interference current, is generally below 100 millivolts, the current required in resistance $R_5$ to neutralize the interference is generally a fraction of an ampere.

FIG. 3 illustrates another modification of the interference suppressor as applied in the Schering-bridge testing circuit S. This arrangement is almost identical with that shown in FIG. 1, except that here the source of voltage supplying the interference suppressor is a linear amplifier 29 rather than the synchronously-driven generator 18 shown in FIG. 1.

The input to this linear amplifier 29 is obtained from the same overhead high-voltage lines that produce the interference. Hence, even if the interference current contains harmonics, the output of the amplifier 29 which is now used to neutralize the interference, contains the same harmonics and will thus completely suppress the interference.

In FIG. 3, interference current can flow from energized conductors 15, 16 through capacitor $C_2$ to the terminal 12 of the test specimen 23, whose impedance is indicated by $C_6$ and $R_6$. From terminal 12 there is a low-impedance path via cable lead 11 and thence through the bridge element $R_3$ to terminal 3, and from there to ground by way of high-voltage winding 7. This spurious current in $R_3$ causes erroneous readings in the Schering-bridge measuring circuit S.

The input to the linear amplifier 29 is also obtained from lines 15, 16. It flows through the equivalent capacitance $C_1'$ to a small antenna 30, which is located during the testing operations, adjacent to terminal 12 of the test specimen 23. From antenna 30 the input current is brought into the bridge S by a shielded cable 28, which is similar to the shielded cable 11, used for connecting from the Schering-bridge circuit to the test sample 23.

Cable 28 connects inside of shielded box 2 to potentiometer resistance 7. The other end of resistance 7 connects to $R_3$ at point 3. The voltage input to linear amplifier 29 is adjusted by the insulated potentiometer control rod 22'. The voltage on resistance $R_7$ between the movable electrode and point 3, is now impressed on the input terminals of amplifier 29. One of the output terminals of the amplifier 29 connects to resistance $R_8$ (which should be large as compared to $R_3$), and thence to terminal 9 of the bridge resistance $R_3$. The other output terminal connects to $R_3$ at point $3b$.

Since the interference input on potentiometer $R_7$ and bridge resistance $R_3$ come from the same source, they have the same wave shape and are in phase. The output from amplifier 29 is 180 degrees out of phase with the input, and hence also 180 degrees out of phase with the interference current in $R_3$. It is thus in the proper phase relation to suppress the interference current in $R_3$. The magntiude of neutralizing current or voltage can be adjusted to the proper value by potentiometer 7. As explained in connection with FIG. 1, this adjustment can be made before the bridge transformer 6, 7 is energized, by adjusting for zero deflection on the null meter 8.

FIG. 4 illustrates an arrangement which is identical to that of FIG. 3, except that in this case cable leads 11 and 28, which are almost at equal potentials, are combined into a single cable. This has the effect of simplifying the apparatus by eliminating one of the two cables between the bridge S and the test sample 23. The operation is otherwise exactly the same as was described in connection with the embodiment of FIG. 3.

FIG. 5 shows in detail one form of amplifier 29 that may be used in the apparatus of FIGS. 3 and 4. Here, the reference numeral 31 represents a four-element vacuum tube, such as a 1L4 tube. However, any type of linear amplifier, or a transistor-type amplifier, may be used. Here, the input to the amplifier 29 is a capacitance current that flows from overhead line 15 through the equivalent capacitance $C_1'$ and thence by cable lead 28 to potentiometer resistance $R_7$, and to ground via coil 7. The input voltage is varied by potentiometer $R_7$. The output of the amplifier 29 is impressed upon the primary of transformer 32. The secondary coil of this transformer is connected to resistance $R_8$, and thence to terminal 9 of resistance $R_3$. The other side of the secondary coil connects to terminal 3 at the opposite end of resistance arm $R_3$. Thus, the output of the amplifier 29 flows through resistance $R_3$ in a direction indicated by the dotted arrow. The interference current flows downward from the equivalent capacitance $C_2$ and cable 11 through $R_3$, as indicated by the solid arrow, and thence to ground through coil 7. When the amplifier current in resistance $R_3$ is just equal to the interference current, the net current in resistance $R_3$ becomes zero, all of the interference current now being shunted into the amplifier circuit.

In more detail, as the amplifier current increases, less and less interference current flows in resistance $R_3$. The total current flowing through capacitance $C_2$ remains constant, but it is being shunted out of resistance $R_3$, and flows through resistance $R_8$ and secondary coil 32, to ground via coil 7, so that when potentiometer input $R_7$ is properly adjusted, there is no interference current in $R_3$. A variable capacitor $C_7$ may be used to compensate for a slight phase displacement from 180 degrees that may be introduced by the output transformer 32. The 60 cycle impedance of capacitor $C_7$ should be high as compared to resistance $R_7$. This capacitor is also useful in by-passing very high frequency oscillations.

FIG. 5 shows an amplifier 29 with transformer-coupled output. However, it is also possible to use a capacitance-coupled output, as shown in FIG. 8, for ammeter-wattmeter type instruments. This may in some cases be desirable, since the phase shift of the output of the amplifier 29' can be made negligible so that no phase adjustment is required. It is thus evident that FIG. 5 is shown only as a typical example, and that any linear-type amplifier 29, including transistor amplifiers, may be used.

FIG. 6 illustrates the use of the interference suppressor of my invention with an ammeter-wattmeter type of instrument for loss and capacitance measurements of insulators, such as terminal bushings, etc. Here, the reference numerals 33 and 34 indicate, respectively, the low-voltage primary and the high-voltage secondary of a transformer supplying the test voltage for the instrument. Low-voltage winding 33 is connected to a low-voltage outlet, or energy source, on the system. The high-voltage side of coil 34 connects, by a cable lead 35, to the high-voltage terminal 12 of the specimen 23 to be tested—in this case illustrated by a terminal bushing. The low-voltage side of coil 34 is connected at point 42 to a shield 36 that shields the winding 34, and cable lead 35 all the way up to the point where lead 35 attaches to terminal 12. Outside of cable shield 36, there is another grounded cable shield 37. From point 42 the test circuit connects to the wattmeter W current coil, thence to nullmeter shunt 44 (which consists of a low resistance in the order of 1 ohm), thence through the current coil of ammeter A, and from here to ground via lead 39.

The operation of this device is as follows: The high-voltage coil 34 supplies the test current which flows through lead 35 to terminal 12 of test specimen 23, and thence through its impedance, which is indicated in the figure by $C_6$ and $R_6$, to ground. The test current then returns by lead 39 to the ammeter A, flows through the ammeter A, nullmeter shunt 44, wattmeter W current coil, and returns via lead 38 to the low-voltage side of coil 34 at point 42.

Since coil 34 and lead 35 are shielded by shield 36, any capacitance current that flows to shield 36 returns directly to the low-voltage side of coil 34 at point 42, and does not pass through the measuring instruments. Thus, only the current that enters the test specimen 23 at point 12 returns through lead 39, and flows through the measuring circuit.

However, if the measurements are made in the proximity of an energized high-voltage line 15, there is an effective capacitance $C_2$ between this line 15 and terminal 12. The current that flows from line 15, through capacitance $C_2$ to terminal 12 has two parallel paths to ground, (1) via the specimen impedance $C_6$ and $R_6$, and (2) via leads 35, coil 34, lead 38, through the metering circuit and thence to ground via lead 39. Since the impedance $C_6$, $R_6$ is very much higher than the parallel impedance through the metering circuit, practically all of the current in $C_2$ will pass through the meters W and A and cause them to read erroneously.

This interference current may now be observed prior to energizing test transformer coil 34, by noting the deflection of the sensitive ammeter A. It may also be observed by means of a still more sensitive nullmeter amplifier N, which in some instances may not be necessary.

By means of the interference suppressor circuit IEC indicated here by leads 45, 46, potentiometer $R_1$ and leads 40, 41, the interference current flowing in the meter branch of the circuit may now be eliminated.

As described in FIGS. 1 and 2, the potentiometer $R_1$ is supplied through leads 45, 46 with a suitable voltage that can be varied in phase with respect to the system voltage. A lead from the movable point of potentiometer $R_1$ connects to resistance $R_2$ (which should be very high with respect to the meter circuit resistance), to lead 41 and thence attaches to lead 38 at the point indicated by arrow 41'. Lead 40 connects from one end of the potentiometer $R_1$ to lead 39 at the point indicated by arrow 40'.

By varying the voltage input and the phase of the suppressor circuit IEC, which is connected to the terminals of the meter circuit, it is now possible to divert all of the interference current through $R_2$, $R_1$, and lead 40 and thence to ground. Thus, no interference current exists in the meter circuit. When the test circuit is now energized, testing may proceed without interference.

FIG. 7 illustrates schematically the operation of the interference suppressor IEC. Here, the reference numeral 461 represents the suppressor voltage which is variable in phase with respect to the system voltage. This supplies the suppressor voltage to potentiometer $R_1$. A portion of this voltage between ground and the movable point of $R_1$ is impressed through resistor $R_2$ across the ammeter, wattmeter circuit. The suppressor current that flows through the meter branch is indicated by the dotted arrow. The interference current in the meter circuit is indicated by the solid arrow. The total interference current $I_x$ that flows from line 15 through $C_2$, lead 35, and coil 34 normally goes to ground through wattmeter W and ammeter A. However, as the suppressor current in opposite phase to it increases, mroe and more of the interference current is shunted out of the metering circuit into $R_2$, until finally all of the interference current $I_x$ flows in $R_2$ and none of it in the metering circuit.

The circuit arrangement of FIG. 8 is similar to that of FIG. 7, except that here a linear amplifier 29' is shown as supplying the interference suppressing voltage. As previously described in connection with FIGS. 3, 4 and 5, the input to this amplifier 29' is obtained from the same overhead lines that produce the interference. Hence, the wave form of the input voltage to the amplifier 29' is the same as that producing the interference. The output of the linear amplifier 29' can then be used to suppress the interference current, even if this current contains harmonics.

In the circuit arrangement of FIG. 8, the interference current flows from line 15 through capacitor $C_2$, cable 35, coil 34, lead 38, and thence to ground through wattmeter W and ammeter A. From the same line, or lines 15, the amplifier input flows through capacitor $C'_1$, antenna 30, cable lead 28, and potentiometer $R_7$ to ground. Potentiometer $R_7$ varies the voltage of the input to amplifier tube 31. The alternating-current output of amplifier tube 31 flows in capacitance $C_8$ and resistance $R_8$, and thence by lead 47 to lead 38, which connects coil 34 to wattmeter W. The amplifier output thus flows through wattmeter W and ammeter A to ground in a direction indicated by the dotted arrow, in opposition to the interference current, which is indicated by the solid arrow. Now, by adjusting the input at potentiometer $R_7$, the suppressor current can be made just opposite and equal to the interference current. The interference current then by-passes the wattmeter-ammeter branch, and flows to ground via lead 47, resistance $R_8$, capacitance $C_8$ and the vacuum tube 31 to ground.

The output voltage of amplifier 29' is normally displaced 180 degrees from its input voltage. This is just the proper phase displacement to suppress the interference in the wattmeter-ammeter circuit. Although the blocking capacitor $C_8$ tends to introduce a small phase displacement in the output current, this can be made negligibly small by making the impedance of capacitance $C_8$ small as compared to resistance $R_8$.

It should be noted that the amplifier circuit 29' shown in FIG. 8, can be substituted directly for the one shown in FIG. 5, for use in the suppressor circuits of Schering bridges, as shown in FIGS. 3 and 4. It would then suppress interference in resistance $R_3$ instead of interference current in the wattmeter and ammeter. Similarly, it is also clear that the circuit 29 shown in FIG. 5 could be used in place of the one shown in FIG. 8.

FIG. 9 illustrates a different circuit arrangement of wattmeter-ammeter instrument for measuring loss and capacitance of insulation, and also a static-type of voltage supply for the interference suppressor. This voltage supply can be energized from a single-phase outlet on the system being tested. The ammeter-wattmeter assembly is indicated by reference numeral 69 and the voltage-supply assembly by the reference numeral 70.

The operation of this instrument is as follows: Coils 48 and 49 are respectively the low-voltage primary and high-voltage secondary of the instrument test transformer. Coil 48 is supplied from any suitable low-voltage outlet of the system, such as the 110 volt supply indicated. The high-voltage end of coil 49 is attached to the high-voltage shield 53 at point 51. The shield 53 shields the primary coil 52 of a current transformer in the high-voltage lead. From coil 52, cable lead 54 connects the high-voltage terminal 12 of the specimen 23 to be tested. The cable lead 54 has an inner high-voltage shield which is connected to, and forms a part of shield 53. The cable also has an outer grounded shield 71a. Hence it is clear that any current that enters coil 52 at point 51 will flow into terminal 12 of the test specimen 23 and thence through its impedance $C_6$ and $R_6$ to ground. Coil 52 and lead 54 are surrounded by shield 53, which is at essentially the same potential as conductors 52 and 54, thus preventing any capacitance current between these conductors and shield 53.

The current transformer CT whose primary coil is 52, has a secondary coil 55. This coil is located within shield 71, which is at ground potential. Coil 55 supplies a current through the wattmeter W and ammeter A, which is proportional to the test current flowing in primary coil 52. The voltage for wattmeter W is supplied by a tertiary coil 50 of the high-voltage test transformer 48, 49. Coil 50 is also shielded to ground potential by shield 71. The wattmeter W will now read the loss and the ammeter A the current in test specimen 23.

If, however, there is one or more energized conductors, such as the high-voltage conductor 15 in the vicinity of test instrument 69, an interference current will flow from high-voltage conductor 15 through the effective capacitance $C_2$ to terminal 12 of specimen 23. From here it will go to ground via conductor 54, and coils 52 and 49. Interference current in coil 52 will induce a proportional current in the secondary coil 55, which will flow through wattmeter W and ammeter A, thus causing erroneous readings in these instruments.

To suppress this interference current in the wattmeter and ammeter, a suppressor circuit IEC''' is introduced into enclosure 71, by means of leads 58, 59. The voltage on these leads can be varied to any desired phase or magnitude. Leads 58, 59 connect to the potentiometer $R_1$. The movable point of $R_1$ connects to a high resistance $R_2$ and thence to switch 57, which when closed connects to the ammeter side of the measuring circuit. Lead 59 continues from its connection to $R_1$, to switch 56, which when closed, connects to the wattmeter side of the measuring circuit. Now, by varying the voltage and phase of the input from the suppressor circuit IEC''', the interference current that flows through the current coils of wattmeter W and ammeter A, can be diverted so that all of it flows through the suppressor circuit, and none in the instrument coils. The point at which the interference current is totally suppressed in the measuring circuit is easily determined, since the ammeter A will then show zero deflection prior to energizing the test transformer 48, 49.

With further reference to FIG. 9 of the drawings, the reference numeral 70 designates the assembly of a static suppressor voltage supply that operates from a single-phase input. This is an arrangement which produces from the single-phase input, a 3-phase output, from which a single-phase supply of continuously variable phase can be obtained to provide the necessary suppressor voltage.

The operation of this device shown in FIG. 9 is as follows: Input lines 66, 67 are connected to any suitable low-voltage outlet of the system. Across lines 66, 67 are connected three leads, the first consisting of resistance 72 in series with inductance 75, the second consisting of resistance 73 and capacitance 76, and the third of resistance 74 and resistance 77. The currents in resistances 72, 73 and 74 need not be equal, but should be of the same order of magnitude. The voltages across each of them are adjusted to be approximately equal. The current in 74 is in phase with the input voltage. Capacitor 76 is adjusted so that current in 73 leads the input voltage by 30 electrical degrees. The inductance 75 is adjusted so that the current in 72 lags the input voltage by 30 electrical degrees. The voltages across resistances 72, 73 and 74 are now impressed respectively on the primary coils of three small similar transformers A, B, and C. The secondary coils $a-d$, $b-e$ and $c-f$ can now be connected to form a 3-phase output by reversing the voltages on coils $a-d$ and $b-e$. The phase relations of these coils are shown in FIG. 10.

It is thus obvious that these coils can be connected to form a 3-phase system, and if double secondaries are provided on the transformers, a 6-phase system. The connection shown in FIG. 9, is a closed delta, but the coils may also be connected in Y by connecting together points $c$, $e$ and $d$, and taking the output from $f$, $a$ and $b$.

It would also be possible to use an open-delta output, in which case transformer B, capacitor 76, and resistor 73 could be omitted. Resistors 74 and 77 could further be omitted if transformer C were connected directly across 66, 67, and its ratio reduced so that output voltage $c-f$ were equal to voltage $a-d$. Since the energy supply required for the suppressor circuit IEC''' is small (usually 1 milliampere or less at about ten to twenty volts), the apparatus indicated by reference numeral 70 can be made very small.

In FIG. 9, the output of the 3-phase secondaries of transformers A, B and C is carried by conductors 63, 64 and 65 to a 3-phase inductance coil 62. Coil 62 is a continuous helical winding on a preferably laminated magnetic core 68. Core 68 has three spokes at 120° spacing. The leads 63, 64 and 65 are solidly connected to the winding 62, at points opposite each of the three spokes, so that winding 62 constitutes a delta-connected load, with each of the three phases connected across 120° of the winding. The winding 62 is designed so that its core 68 will remain below saturation at the voltage impressed on it by the transformers. Hence, it normally draws only enough current to provide excitation.

Riding on the surface of the continuous winding 62 are two brushes 60, 61, spaced 180° apart. Brushes 60, 61 are mechanically connected together by means of an insulating arm, and arranged so they are rotable the full 360° on the periphery of winding 62. A single-phase voltage is thus obtained at terminals 60, 61 that is variable in phase throughout 360°, as required for the interference suppressor. This voltage is impressed on potentiometer $R_1$ of the interference suppressor IEC''' by means of leads 58 and 59.

For the 3-phase arrangement shown, there is a voltage variation of about 13% as brushes 60, 61 are rotated around winding 62. This is not critical since the final voltage output can be adjusted again by means of potentiometer $R_1$. However, if a better voltage regulation is desired, double windings may be provided on each of the secondaries of transformers A, B, and C. These can then be connected to form a 6-phase system in which the voltage output from brushes 60, 61 will remain almost constant.

The actual power output required through brushes 60, 61 to supply the interference suppressor IEC''' is so small that in most cases it would be possible to replace the inductive winding 62 with a resistive winding on an insulating non-magnetic core.

Although this interference suppressor voltage supply 70 has been shown in connection with a particular type of wattmeter-ammeter instrument, it should be noted that it can also be applied to Schering bridge instruments, as for example the one shown in FIG. 2, or to any type of measuring instrument in which interference currents may occur.

FIG. 11 illustrates the manner in which interference currents can be suppressed in a simple measuring circuit in which a sensitive ammeter, such as a microammeter, is used to measure the capacitive impedance of a high-voltage bushing, which is located near high-voltage lines. Spurious currents flowing from the energized lines, through the air capacitance between the lines and bushing top, and thence to ground via the ammeter and high-voltage transformer coil would cause serious errors in the ammeter readings, if the suppressor circuit were not used.

In FIG. 11, the coils 80 and 81, represent, respectively, the low and high-voltage sides of the high-voltage source supplying the voltage for the measurements. Voltmeter 79 measures the supply voltage, which, multiplied by the transformer ratio, indicates the test voltage. Lead 84 from the high side of coil 81 connects to the shield case 83 at point 85, and thence to terminal 86 of the ammeter 87. The other terminal 88 of the ammeter is connected to cable lead 89, which terminates on the high-voltage terminal 12 of terminal bushing 23. Shield box 83 is at the high potential of coil 81, and is insulated by the insulators 112 from the grounded shield box 82. The cable lead 89, which connects from terminal 88 of the meter 87 to terminal 12 of the bushing 23, is doubly shielded between boxes 82, 83 and bushing terminal 12. The inner cable shield 90 connects to box 83, and hence is at approximately the same potential as lead 89. This is so since the voltage drop through the ammeter 87 due to the measuring current is generally only a fraction of one volt. The outer shield 91 connects to shielding box 82, and hence is at ground potential.

Since the ammeter 87 and lead 89 are at essentially the same potential as the surrounding box 83 and shield 90, there will be negligible capacitance currents flowing between the meter circuits and the shields. Hence, the same current that flows through meter 87 also flows through the test sample 23 and returns to coil 81 via ground lead 113. There is a capacitance current from box 83 to box 82, and from shield 90 to shield 91. This current flows from coil 81 to point 85. From here it flows into shields 83 and 90, and through the capacitance, from 83 and 90 to shields 82 and 81, which are grounded. This current thus returns to the ground side of coil 81 without passing through the current meter 87.

If there is no interference from adjacent A.-C. lines, the circuit described above will accurately measure the current through the test piece 23, without the use of the suppressor circuit IEC. However, if energized high-voltage lines 15, 16 are near the test piece 23, since the lines are at high potential above ground, there will be a capacitance current flowing through the air capacitance $C_1$, $C_2$ between the lines 15, 16 and terminal 12 as indicated by the current $I_x$. This current will return to ground via lead 89, meter 87, lead 84 and coil 81, since this is a very much lower impedance path than through the test sample 23. This spurious current $I_x$, which flows through meter 87 causing it to read in error, is in no way impeded by the shielding described above.

The suppressor circuit IEC of this invention can, however, by-pass this spurious current $I_x$ around the measuring instrument 87 so that it will not be read by the meter 87. The measuring current can then be read accurately on the meter 87. One embodiment of this suppressor circuit IEC is shown in FIG. 11, and its operation, as shown in this figure, will be described.

A small A.-C. generator 18 is mounted within the high-voltage shield box 83. Generator 18 is driven by a synchronous motor 19 which has the same number of poles as the generator 18. The motor 19 is at ground potential and is connected to the generator by the insulating shaft 20. The motor 19 is mounted by means of rods 109 to a circular plate 21, which fits into a bearing 108. This mounting permits motor 19 to be rotated about its axis to any position. When the desired position is reached, clamps 110 can be tightened to hold it from moving. Power to operate the motor is obtained by plugging in lead 111 to any convenient low-voltage outlet on the same system.

The output of generator 18 is impressed upon terminals 102, 103 of potentiometer 99. This potentiometer 99 should have fine adjustment such as, for example, a 10-turn micropot. From the movable point 101 of this potentiometer 99, a high resistance 98 is connected to terminal 88 of meter 87. Another lead is connected from terminal 103 of the potentiometer 99 to terminal 86 of the meter 87. There is now impressed across the meter 87 the potentiometer voltage between points 101 and 103. The phase of this voltage can be adjusted to any desired value by rotating motor 19. The magnitude of the voltage can be adjusted from zero to maximum output of generator 18 by moving point 101 of the potentiometer 99 with the insulated control handle 22a. The resistance 98 should be in the order of 100-times the impedance of current meter 87.

The presence of interference current $I_x$ can be observed prior to the application of the test voltage by a deflection on meter 87. By adjusting the phase and magnitude of the suppressor voltage, it is now possible to cause a current to flow through meter 87, 180 degrees out of phase from $I_x$. This current directly opposes $I_x$, and, as it is increased to exactly equal $I_x$, there is no current flowing through the meter 87. All of the $I_x$ current is now by-passed through the resistance 98, the section of the potentiometer from 101 to 103, thence to the other terminal 86 of the meter 87 and to ground through coil 81. Coil 81 can now be energized, and testing can proceed without interference from the spurious capacitance current $I_x$.

In FIG. 11, the loop 17 was drawn to represent a magnetic field due to adjacent conductors 15, 16 linking the test circuit and inducing a spurious voltage in the circuit. Where the test piece 23 is of such high impedance value, as a terminal bushing, this would have a negligible effect. However, where the test sample impedance is low, and the test is made adjacent busses carrying high currents, an appreciable error current might be produced. Such currents, as well as the capacitance currents, would be by-passed around the meter by the suppressor circuit IEC.

Although the simple circuit of FIG. 11 shows only an ammeter 87 in the measuring circuit, it should be understood that additional meters, such as wattmeters, null-meters, etc., may be added. This is illustrated in FIGS. 6, 7, 8, and 9. A resistance element such as $R_3$ in FIGS. 1, 2, 3, 4, and 5, may also be substituted for the ammeter 87.

FIG. 12 illustrates the suppression of a sine wave interference current as indicated by wave $a$, by a sinusoidal current from a generator, such as produced by generator 18 in FIG. 1. The sinusoidal suppressor current is indicated by the dotted curve, $b$, which is equal and opposite to curve, $a$. The resultant current that flows through the measuring instrument is then zero, as indicated by curve, $c$.

In FIG. 13 the interference current is indicated by curve $d$. As shown, it contains about ten percent of ninth harmonic current. (This is larger than would be expected in practice, but is used for the purpose of illustrating the effect of harmonics.) When a sine wave suppressor current is now used to suppress this interference, it diverts all of the fundamental part of the wave out of the measuring instrument, but it cannot remove the harmonic. Thus, there remains a current, $e$, which still flows through the instrument. Where the total interference is small, or where the harmonic content is small, this may not result in serious error, but it would be desirable to remove the harmonic current as well as the fundamental. A method by which this can be done is illustrated in FIG. 14.

As in FIG. 13, the interference current which is indicated by curve $d$ in FIG. 14, contains a ten percent ninth harmonic. However, in this case the suppressor current is produced by an amplifier 29 in which the input is energized from the same source, namely the high-voltage overhead lines, that produce the interference. Hence, with a linear amplifier 29, the amplifier output has the same wave shape as the interference current. The amplifier suppressor current is here represented by curve, $f$, which is equal and opposite to the interference. Hence, it diverts all of the interference current out of the measuring instrument, as indicated by the resultant zero curve $g$ in FIG. 14. The use of such an amplifier suppressor 29 is illustrated in FIGS. 3, 4, 5 and 8. Another advantage of this system is that the suppressor wave produced by the amplifier is 180 degrees out of phase with the interference, and hence generally requires no phase adjustment.

FIGS. 1 to 14 have, in general, illustrated measurements on relatively high impedances, consisting mainly of capacitive impedance, such as high-voltage terminal bushings, transformer insulation, etc. FIG. 15, on the other hand, illustrates the use of interference suppression in the measurements on relatively low impedances. Whereas in the high impedance cases the interference currents were produced by capacitive currents from adjacent high-voltage lines 15, 16, and magnetically-induced currents were negligible, in the low-impedance measurements the interference currents are induced mainly by magnetic induction from adjacent current-carrying conductors; and capacitive interference is generally negligible. The measurements are made at relatively low voltages, and currents used are in the ampere range rather than microamperes used with the high impedances.

In FIG. 15, an inductance coil 193, adjacent to bus 95, which is carrying high current, and also adjacent another energized inductance 94, is being measured to determine the impedance and power factor of the inductance coil 193. The coil 193 may be, for example, a current-limiting reactor in one of the lines of a power station, and coil 94 and adjacent energized reactor. Although coil 94 may be spaced 10 or more feet from coil 93, it produces a powerful magnetic field, some of which (as indicated by the dotted loop 96) links coil 193 and induces a current in the measuring circuit. Bus 95, which represents one of the main high-current-carrying busses in the power station, also produces a magnetic field, a part of which indicated by dotted loop 97, links coil 193 and induces a spurious current in the measuring circuit. The measuring circuit is contained in a grounded and magnetically-shielded box 82. This box would be made of high magnetic permeability material, or may even consist of two boxes of such material, one within the other, so that practically none of the external magnetic field can exist within the box 82. Energy for the measurements is obtained through leads 107, 107a, which may be connected to any suitable relatively low-voltage outlet on the system. By closing switch 114 to the left, autotransformer 106 is energized. Voltage is provided to the test circuit from transformer 106 through leads 92, 93, and may be varied by moving the location of the movable tap 93. The ammeter A and the current coil of wattmeter W are connected in series with leads 89, 93, and the wattmeter potential coil and voltmeter V are connected across leads 89 and 92. The leads 89, 92 are led through a magnetically and electrostatically-shielded cable 91 to the terminals of coil 193.

If there is no magnetically-induced currents in the coil 193, or in the measuring circuit connected to it, accurate readings of the meters A, W may now be made. However, if there are adjacent high-current-carrying circuits, they will induce spurious currents in the measuring circuit, thus preventing accurate measurements. If switch 114 is now closed to the right, voltage is removed from the measuring circuit, but the circuit is closed through the low impedance of short-circuited transformer 106. The spurious induced currents can now flow freely through the ammeter A and wattmeter W. The current will now be indicated by the ammeter reading. Now, as already explained for FIGS. 1 and 11 for high-impedance measurements, these spurious currents can be by-passed around ammeter A and wattmeter W, by use of the suppressor generator 18. This generator, which is synchronously driven by synchronous motor 19, supplies a sinusoidal voltage to potetiometer 99. The phase of this voltage can be varied to any desired value by rotating motor 19 about its axis. Motor 19 is mounted on plate 21, so as to make it rotatable in its mounting 108, and can be held in the desired position by clamp 110. A voltage can now be impressed from potentiometer 99 through resistance 98 to terminals 86, 88 of the ammeter-wattmeter circuit. The suppressor circuit IEC now supplies a current through the ammeter A and wattmenter W, which can be varied in magnitude and phase. When it is adjusted to be exactly equal and opposite to the interference current, no current flows in the ammeter A and wattmeter W, since all of it is by-passed through the suppressor circuit IEC. The switch 114 may now be closed to the left, and testing can proceed without interference from the spurious induced currents.

Although a motor-generator type of suppressor IEC has been shown in FIG. 15, a clamped wound-rotor induction motor type of phase-shifting supply for the suppressor IEC would be equally applicable. Such a supply is shown in FIG. 2.

Another possible source of suppressor current is indicated in FIG. 15. This is the use of a linear amplifier 115 and a circuit similar to those already described for the high-impedance measurements. Input to this amplifier 115 would be from a small coil 100 placed at a point where it intercepts a portion of the magnetic field producing the interference. By adjusting the phase and magnitude of this input voltage, the output current of the amplifier 115 can be made equal and opposite to the interference current flowing in the ammeter-wattmeter circuit. This output is connected to the terminals 86, 88, thus reducing the spurious current in the ammeter and wattmeter to zero, and by-passing it through the amplifier 115. In FIG. 15, the reference numeral 100 represents the pick-up coil for the amplifier input. Its voltage is carried to the amplifier input over leads 104, 104a in shielded cable 191. Numeral 115 represents the linear amplifier, whose output leads 105 connect to terminals 86, 88 of the ammeter and wattmeter.

FIELD AND LABORATORY TESTS

A series of tests using test apparatus essentially as shown in FIG. 1, was made in which the power factor was measured on high-voltage bushings 23 located on apparatus in a substation of a large power system. The location for these tests was chosen because it was directly under an energized high-voltage transmission line where a maximum amount of interference would be present. To further increase the interference, the leads to the bushings were not disconnected at the bushing cap 12, and about 10 to 15 feet of lead and the disconnect blade were left attached to each bushing 23 thus greatly increasing the capacitance to the overhead lines.

In this case a generator 18 (FIG. 1) produced a voltage of approximately 32 volts, which could be varied in phase by rotating the synchronous driving motor 19. This voltage was impressed on a ten-turn potentiometer $R_1$ by means of which any fraction of the 32 volts could be impressed through the known resistance $R_2$, across the bridge element $R_3$. The resistance $R_2$ in this case was 100 times, or more larger than $R_3$, so that its parallel resistance was negligible. Since the voltage impressed on $R_2$ and its resistance was known, the current through it, and through $R_3$, required to bring the interference current in $R_3$ to zero, as indicated by the nullmeter 8, could be readily calculated. The interference current in these tests, was found to be about 400 to 500 microamperes. Even though this was over 20% of the normal bridge current, it was readily possible to balance the bridge and obtain power factor measurements. Without the interference suppressing circuit, a large off-scale negative reading was obtained when the bridge test voltage was at one polarity, and a large positive reading when polarity was reversed, so that no power factor measurements could be made.

In another series of tests made to measure the power factor of transformer insulation on apparatus located in the field adjacent to energized high-voltage lines, the interference current was about 120 microamperes. Excellent results were obtained with the interference suppressor circuit IEC. The bridge reading with direct and reversed polarity was exactly the same, so that no averaging of readings was required. Without the interference suppressing circuit IEC, it was necessary to insert an inductance to keep both polarity readings positive, and readings had to be corrected and averaged.

In the first series of tests in which interference current was as high as 500 microamperes, it was found that at the highest interference, there was a slight difference in readings when bridge polarity was reversed, so that the two readings had to be averaged, as is normally done for bridge readings. However, the readings were nearly the same, and no difficulty was encountered in balancing the bridge. The very slight interference remaining is believed to be due to the presence of harmonics in the interference current. These harmonics, which generally constitute only a small percentage of the interference, cannot be suppressed by a sinusoidal voltage source, such as produced by the generator 18. However, if a linear amplifier 29, 29′ such as shown in FIGS. 3, 4, 5, 7 and 8, is used to supply the suppressor voltage, these harmonics as well as the fundamental of the interference is suppressed.

Laboratory tests using an amplifier circuit 29′ essentially as shown in FIG. 8, proved that interference currents up to over 400 microamperes containing harmonics, could be readily suppressed. There is no technical reason why amplifiers cannot be built to suppress even higher interference. Although a tube-type amplifier is shown, transistor-type amplifiers could readily be used.

Referring to FIG. 3, input to the amplifier 29 is obtained from lines 15, 16 by capacitance current through capacitor $C'_1$ to an antenna 30. The same voltage produces the interference current, which flows through capacitor $C_2$ thence to bushing cap 12, lead 11, and through resistance $R_3$ to ground. Since the input to the amplifier 29 contains the same harmonics as the interference current, the harmonics as well as the fundamental of the interference can be suppressed by the amplifier output. This output is impressed on the bridge element $R_3$ through the high resistance $R_8$.

The suppression of interference currents is illustrated in FIGS. 12, 13 and 14. As pointed out hereinbefore, FIG. 12 illustrates how a sinusoidal interference can be completely suppressed by a sinusoidal suppressor voltage. FIG. 13 shows the result when a sinusoidal voltage is used to suppress an interference current containing harmonics. The fundamental in this case is suppressed, but the harmonics remain. FIG. 14 shows how an interference current containing harmonics is completely suppressed, if the output from an amplifier 29, 29′ energized by the same voltage as the interference, is used to supply the suppressing voltage. From the foregoing specification it is apparent that I have invented means for suppressing interference in A-C measuring circuits due to spurious currents induced in the measuring circuits either by capacitive coupling from adjacent high-voltage conductors, or by magnetic induction from adjacent current-carrying A-C conductors.

By application of my invention, these spurious currents may be bypassed around the measuring instruments, so as to have no effect on the measurements, whereas the measuring current passing through the instrument is not affected by the suppressor circuit IEC.

Also, by application of my invention, these spurious voltage across an element in the instrument may be neutralized by a counter voltage, which has negligible effect on the voltage across this element produced by the measuring current.

Thus it is apparent that the effect of either a spurious voltage or a spurious current in an A-C measuring circuit can be eliminated by use of my invention.

Accordingly, from the foregoing description of various embodiments of my invention, it will be apparent that I have provided improved and accurate measuring instruments, which can be used in close proximity to high-voltage, or heavy current-carrying lines, and I have described improved and novel means for neutralizing the inductive effects of such proximate lines, which otherwise would result in erroneous and inaccurate readings. The auxiliary devices of my invention are relatively inexpensive and may be easily incorporated into the basic measuring circuitry.

Although there have been illustrated and described various embodiments of my invention, it is to be clearly understood that the same were merely for the purpose of illustration, and that changes and modifications may readily be made therein by those skilled in the art, without departing from the spirit and scope of the invention.

I claim as my invention:

1. A Schering-bridge circuit including adjustable impedances connected in first and second arms of the bridge circuit and joined at a first junction point, a current balance indicator, said bridge circuit having a condenser of fixed capacity in the third arm thereof, said bridge circuit having cable-connecting means for connecting an insulating specimen in the fourth arm thereof, said third and fourth arms of the bridge circuit meeting at a second junction point, a high-voltage source for impressing high-testing voltage across the first and second junction points, means for adjusting said adjustable impedances for balancing the bridge circuit so that no current wil flow through the current balance indicator, one or more adjacently-disposed high-voltage lines capable of providing electrical interference in the bridge circuit by inductive effects, and voltage means connected across at least a portion of one of said bridge arms for suppressing said electrical interference on the bridge circuit by bypassing the interfering current around at least one or more of the bridge arms through the suppressing means to counteract the inductive effects of said one or more adjacently-disposed high-voltage lines and reduce the interference current in the one or more bridge arms to zero without affecting the measuring current through said bridge arms, whereby said interfering current in passing through said suppressing means is not measured in the Schering-bridge circuit.

2. The combination of claim 1, wherein the suppressing means for creating the current bypassing effect is supplied by a miniature permanent-magnet sine wave generator driven by a synchronous motor, and means are provided for varying the amplitude and phase of the output current of the suppressing means.

3. The Schering-bridge circuit of claim 1, wherein one of the adjustable impedances ($R_3$) is an adjustable resistance in the first arm of the bridge, and the suppressing means comprises a parallel impedance branch including a potentiometer ($R_1$) for adjusting the current in the parallel impedance branch until no interfering current flows in the said arm of the bridge.

4. The combination of claim 1, wherein the the means for suppressing spurious currents in the said measuring arm comprises a single-phase voltage source from the locked rotor of a three-phase induction motor, that is variable in phase by the rotor position, feeding a parallel circuit around said arm by means of which the proper phase and magnitude of voltage may be impressed on said arm to by-pass said spurious current out of the bridge arm.

5. The combination according to claim 1, wherein the means for suppressing the electrical interference includes an alternating current linear amplifier.

6. The combination of claim 5, wherein the input to the alternating current linear amplifier is inductively coupled to the energized line.

References Cited

UNITED STATES PATENTS

| | | | |
|---|---|---|---|
| 2,920,281 | 1/1960 | Appert et al. | 333—12 XR |
| 3,252,089 | 5/1966 | Nye | 324—78 |
| 3,308,309 | 3/1967 | Wichmann | 330—12 XR |
| 2,130,865 | 9/1938 | Watts et al. | 324—54 |
| 2,307,499 | 1/1943 | Frakes | 324—54 |
| 2,657,352 | 10/1953 | Sink. | |
| 2,677,803 | 5/1954 | Rork | 324—54 |
| 2,832,042 | 4/1958 | Lambert | 324—54 X |
| 3,077,561 | 2/1963 | Revesz | 324—57 |
| 3,211,998 | 10/1965 | Kidwell | 324—54 |

RUDOLPH V. ROLINEC, *Primary Examiner.*

G. R. STRECKER, *Assistant Examiner.*

U.S. Cl. X.R.

324—61; 333—12